(12) United States Patent
Travers

(10) Patent No.: US 8,066,461 B2
(45) Date of Patent: Nov. 29, 2011

(54) THREADED FASTENER

(75) Inventor: Matthew Travers, Mansfield, MA (US)

(73) Assignee: CBT Technology Inc., Randolph, MA (US)

( * ) Notice: Subject to any disclaimer, the term of this patent is extended or adjusted under 35 U.S.C. 154(b) by 237 days.

(21) Appl. No.: 12/395,211

(22) Filed: Feb. 27, 2009

(65) Prior Publication Data
US 2009/0220317 A1    Sep. 3, 2009

Related U.S. Application Data

(60) Provisional application No. 61/032,691, filed on Feb. 29, 2008.

(51) Int. Cl.
  *F16B 21/18* (2006.01)
(52) U.S. Cl. .................. 411/352; 411/413; 411/108
(58) Field of Classification Search ............ 411/352, 411/347, 413, 108, 130, 134, 47, 546
See application file for complete search history.

(56) References Cited

U.S. PATENT DOCUMENTS

| | | | | |
|---|---|---|---|---|
| 2,547,789 A | * | 4/1951 | Skeel | 403/370 |
| 2,860,319 A | * | 11/1958 | Short | 439/758 |
| 3,402,613 A | * | 9/1968 | Neusel et al. | 74/89.35 |
| 4,335,523 A | * | 6/1982 | Bryant | 33/371 |
| 4,616,967 A | * | 10/1986 | Molina | 411/105 |
| 6,439,816 B1 | * | 8/2002 | Nance et al. | 411/108 |
| 6,896,460 B2 | | 5/2005 | Enomoto et al. | |
| 2003/0026675 A1 | | 2/2003 | McGovern et al. | |

FOREIGN PATENT DOCUMENTS

| | | |
|---|---|---|
| JP | 2002174211 A2 | 6/2002 |
| WO | WO-2009/111314 A2 | 9/2009 |

OTHER PUBLICATIONS

"International Application Serial No. PCT/US09/35491, Search Report and Written Opinion mailed Oct. 12, 2009".

* cited by examiner

*Primary Examiner* — Gary Estremsky
(74) *Attorney, Agent, or Firm* — Strategic Patents, P.C.

(57) ABSTRACT

A screw-type fastener includes an internal cinching mechanism that physically locks exposed threads of a screw outside a housing after a certain number of turns. The fastener may for example, be affixed to a faceplate of a printed circuit board. The exposed threads may then be rotated to threadably engage corresponding threads of a sub-rack or other enclosure in a manner that prevents movement of the faceplate relative to the enclosure as the screw engages the enclosure. When the internal cinching mechanism is locked, the physical relationship (e.g., distance) between the faceplate and the sub-rack is retained until the fastener is unscrewed.

22 Claims, 3 Drawing Sheets

THREADED FASTENER

CROSS-REFERENCE TO RELATED APPLICATIONS

This application claims the benefit of U.S. App. No. 61/032,691 filed on Feb. 29, 2008, the entire content of which is incorporated herein by reference.

BACKGROUND

This application relates generally to fasteners and more specifically to threaded fasteners that secure an item at a fixed distance from another item.

Fasteners such as screws and bolts are commonly used to mechanically couple hardware. In some electronics applications, such as where a printed circuit board is attached to an enclosure, it may be preferable to secure the board to the enclosure in a manner that ensures that the board remains seated in an edge connector without imposing stress on the board that might cause electrical or mechanical failure. There remains a need for an improved fastener for use in such applications.

SUMMARY

A screw-type fastener includes an internal cinching mechanism that physically locks exposed threads of a screw outside a housing after a certain number of turns. The fastener may for example, be affixed to a faceplate of a printed circuit board. The exposed threads may then be rotated to threadably engage corresponding threads of a sub-rack or other enclosure in a manner that prevents movement of the faceplate relative to the enclosure as the screw engages the enclosure. When the internal cinching mechanism is locked, the physical relationship (e.g., distance) between the faceplate and the sub-rack is retained until the fastener is unscrewed.

In one aspect, a device disclosed herein includes a screw with a screw head, a first threaded portion, a second threaded portion, and a central axis, the first threaded portion nearer to the screw head along the central axis and having a first pitch and the second threaded portion farther from the screw head along the central axis and having a second pitch; a nut including interior threads corresponding to the first threaded portion, the nut positioned around the central axis of the screw; and a housing having a first opening that exposes the screw head while retaining the screw head within an interior of the housing, and the housing having a second opening through which the second threaded portion can extend, the interior of the housing rotationally retaining the nut and providing a translational stop for the nut that prevents the nut from traveling closer than a predetermined distance toward the first opening when the first threaded portion engages the nut.

In some embodiments the first pitch may be different from the second pitch and the second pitch may be finer than the first pitch. The nut may have an interior diameter greater than an outside diameter of the second threaded portion of the screw. A spring may bias the nut toward the screw head. Another spring may bias the screw toward the first opening of the housing. A partition between the screw head and the nut may be included where the nut may be securely cinched and the screw head engaged with the first threaded portion.

In one aspect, a fastener disclosed herein includes a screw having a threaded portion; a housing around the screw, the housing having a first opening that exposes a screw head of the screw and the housing having a second opening that exposes the threaded portion; and an internal threading mechanism that permits the threaded portion to progressively extend out of the housing to engage a separate threaded screw hole, and that rotationally cinches the screw within the housing after the threaded portion has extended a predetermined distance out of the housing.

The housing may be a two-part housing having a first half and a second half. The first half may press fit to the second half. The first half may be rotationally coupled to the second half by corresponding threaded regions.

In one aspect, a fastener disclosed herein includes a screw with a screw head, a first threaded portion and a second threaded portion; a housing around the screw, the housing having an interior with a partition between a first opening in the housing that exposes the screw head and a second opening in the housing that exposes the second threaded portion; and a nut within the interior and adjacent to the partition, the nut capable of engaging the first threaded portion of the screw to rotationally cinch the screw to the partition with the screw in a position having the second threaded portion extending out of the interior of the housing.

The second threaded portion may be smaller diameter than the first threaded portion. The first threaded portion may have a different pitch than the second threaded portion. A coil spring may be around the screw and positioned between the screw head and the partition to bias the screw head toward the first opening. A washer may be around the screw and positioned between the nut and the partition. A return spring may bias the nut toward the partition. The nut may be keyed to an interior portion of the housing to prevent a rotation of the nut upon an application of rotational force thereto. The screw head may be retained within the first opening by at least one of a lip and a crimp. The housing may have an external feature keyed to an insert in a module faceplate. The second threaded portion may have a pitch corresponding to a threaded screw hole of an enclosure sub-rack. The enclosure sub-rack may be a MicroTCA sub-rack. The screw head may include one or more of a Phillips head, a hex head, a flat head, a hexalobular head, an internal hexalobular head, and a square head. The screw head may include one or more of a thumb screw and a wingnut.

BRIEF DESCRIPTION OF DRAWINGS

The invention and the following detailed description of certain embodiments thereof may be understood by reference to the following figures wherein.

DETAILED DESCRIPTION

The following disclosure relates generally to a threaded fastener that secures an object to another at a fixed distance.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" is intended to mean "and/or" unless otherwise stated to the contrary, and references to elements in the singular ("a", "an", "the", "one", etc.) are intended to also refer to such elements in the plural unless otherwise stated or clear from the context.

Reference will now be made in detail to several embodiments, examples of which are illustrated in the accompanying figures. The figures depict embodiments of the present invention for purposes of illustration only, and are not intended to limit the scope of this disclosure. One skilled in the art will readily recognize that alternative embodiments of the structures and methods illustrated herein may be employed without departing from the principles of the invention.

Figure 1:
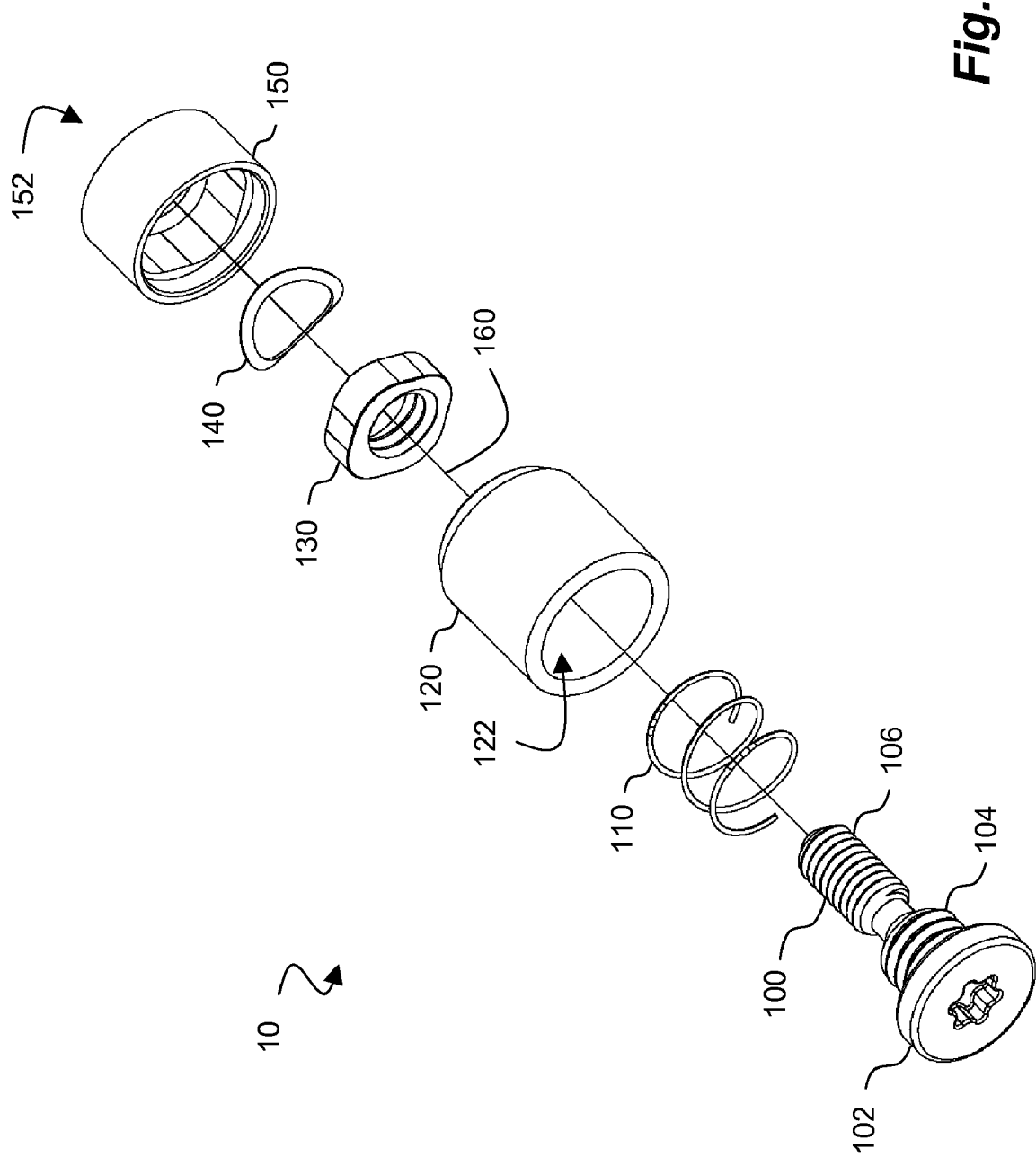
FIG. 1 shows an exploded view of a fastener.

FIG. 1 shows an exploded view of a fastener 10 that may be used to secure a module such as an AMC (Advanced Mezzanine Card) module or other circuit board or the like in a rack such as an ATCA (Advanced Telecommunications Computer Architecture) sub-rack. In general, the fastener may include a screw 100, a compression spring 110, a housing top 120, a nut 130, a wave washer 140, and a housing bottom 150, all substantially centered on a central axis 160 of the fastener (which is, in the depicted embodiment, also the central axis 160 of the screw 100).

The screw 100 may have a screw head 102 shaped to receive a Phillips head, hex head, flat head, square head, hexalobular head, internal hexalobular head, or other screwdriver or tool shape, and may generally includes two threaded portions. A first threaded portion 104 may match the threads of the nut 130 within the housing 120. The second threaded portion 106 may extend through the housing bottom 150 when the fastener is assembled, and may have threads that match a target for the fastener, such as a nut or threaded through-hole of a sub-rack. The first threaded portion 104 may have a larger diameter than the second threaded portion 106. The first and second threaded portions 104, 106 may have different thread pitches. In some embodiments the second threaded portion 106 may have a finer pitch than that of the first threaded portion 104 so that the nut 130 travels along an axis of the screw 100 more quickly than the second threaded portion 106 displaces the screw 100 while engaging corresponding threads of a sub-rack (not shown) or the like. As a result of this relationship, the nut 130 may travel toward the screw head 102 without applying force to a sub-rack that is threadably engaged to the second threaded portion 106. In some embodiments, the screw 100 may also, or instead, be adapted for manual operation in the form of a thumb screw, wingnut, or the like.

A spring 110 such as a compression spring or a coil spring may serve to bias the screw 100 away from the nut 130 and washer 140 or toward an opening 122 that exposes the screw head 102. Within the assembled fastener 10 this bias may prevent the screw 100 from floating loosely along the axis of the fastener 10 and may maintain the screw head 102 near the opening 122 when the fastener 10 is not in use.

The nut 130 may be threaded with interior threads to match the first threaded portion 104 of the screw 100. The nut 130 may have an interior diameter sufficiently large to permit the second threaded portion 106 of the screw 100 to pass through unrestricted. In other embodiments, the nut 130 may have a smaller interior diameter. In such embodiments, the nut 130 may be threaded past the second threaded portion 106 during assembly or the nut 130 may be fabricated in a position between the threaded portions 104, 106. The nut 130 and/or washer 140 may be keyed to an interior of the housing bottom 150 or otherwise rotationally retained in order to prevent rotation of the nut 130 when the screw 100 is being screwed into or out of a sub-rack or other threaded component. While this keying is depicted in FIG. 1 as a square shape with rounded corners, it will be understood that any shape may be employed that prevents rotation of the nut 130 within the housing bottom 150 when rotational force is applied by the screw 100.

A spring or the like may also be positioned between the nut 130 and the housing bottom 150 in order to bias the nut 130 toward the screw 100. This return spring may push the nut 130 toward the upper housing 120. It will be understood that the washer 140 may also or instead provide as similar biasing to the nut 130. The washer 140 may be a wave washer or a crescent washer and may be considered a spring since these type washers may provide biasing. The springs discussed above may be coil springs, torsion springs, leafs springs, biasing springs, or some combination of these, or any other hardware that provides suitable mechanical biasing of components of the fastener 100. The nut 130 may be allowed to float slightly so that the threaded portion 106 of the screw 100 can rotate into proper alignment with the nut 130 before the respective threads engage. As will also be further appreciated with reference to FIG. 3 below, the top housing 120 may present a surface smaller than the nut 130 (and the screw head 102) where the top housing mates with the bottom housing 150 to form a partition against which the nut 130 and screw 100 can cinch. While the surface of the top housing 150 may provide this mechanical stop for the nut 130, it will be understood that any suitable partition within the fastener 10 may similarly be employed. In one embodiment, such a partition permits the screw 100 to pass through (e.g., toward a second opening 152 in the bottom housing 150 to engage threaded hardware) while providing a mechanical stop for the nut 130 so that screw 10 can be rotationally cinched within the fastener 10 after a number of turns. In other embodiments, the screw 100 may directly cinch the nut 130, with suitable modifications to permit an appropriate degree of movement by the nut 130 within the fastener 10. One or more lock washers or other components for improved rotational operation may also be included at a number of locations along the central axis 160 of the fastener 10. The washers discussed above may include crescent washers, waver washers, split washers, lock washers, flat washers, or some other type or combination of washers.

The housing top 120 and housing bottom 150 may retain the screw 100, spring 110, nut 130, and washer 140 as an assembled unit. For example, the opening 122 in the housing top 120 may include a crimp, lip, or other edge or the like to retain the head 102 of the screw 100 within an interior region of the fastener 10. A washer may also be positioned between the nut 130 and the top housing 120. Similarly, the housing bottom 150 may seat and retain the nut 130 and the washer 140. The housing top 120 may be attached to the housing bottom 150 using a friction fit, a press fit, a weld, an adhesive, or any other attachment technique suitable for a mechanical assembly. The housing top 120 may also, or instead, be threaded onto the housing bottom 150 to permit disassembly and re-assembly of the multi-part fastener.

While the two-part housing assembly described above provides for relatively simple assembly and disassembly from easily manufactured parts, it will be understood that other forms of construction may be employed without departing from the scope of this invention. For example, a single housing may be provided, and after a screw is inserted into the housing, one opening may be crimped or otherwise finished to retain the screw head, while a partition may be inserted into the other opening to retain the screw in the opposing axial direction. The partition may be secured, e.g., using an adhesive, a weld, retaining pins, or any other suitable hardware. Thus, with a wide variety of manufacturing options available, it will be understood that the particular embodiments described in detail herein are intended to provide illustrative examples, and do not limit the scope of this disclosure.

Although not depicted in FIG. 1, it will be further understood that the housing bottom 150 may include a mechanically keyed exterior adapted to fit into a corresponding insert in a module, module faceplate, rack, sub-rack or other hardware such that the housing cannot rotate about its axis (such as in response to rotational force applied to the screw 100). For example, the housing bottom 150 may be keyed to insert into a module faceplate to retain the fastener 10 and prevent rotation of the bottom housing 150 (and more generally, the fastener 10) when the screw 100 has rotational force applied.

Additionally, in some embodiments of the fastener 10 the second threaded portion 106 of the screw 100 may be replaced with other attachment structures. For example, the screw 100 may include an "L" shaped structure on an end thereof, where the "L" includes an arm that engages a flange or other surface when the fastener 10 is cinched to retain the fastener 10 and any related hardware against axial movement.

Figure 2:
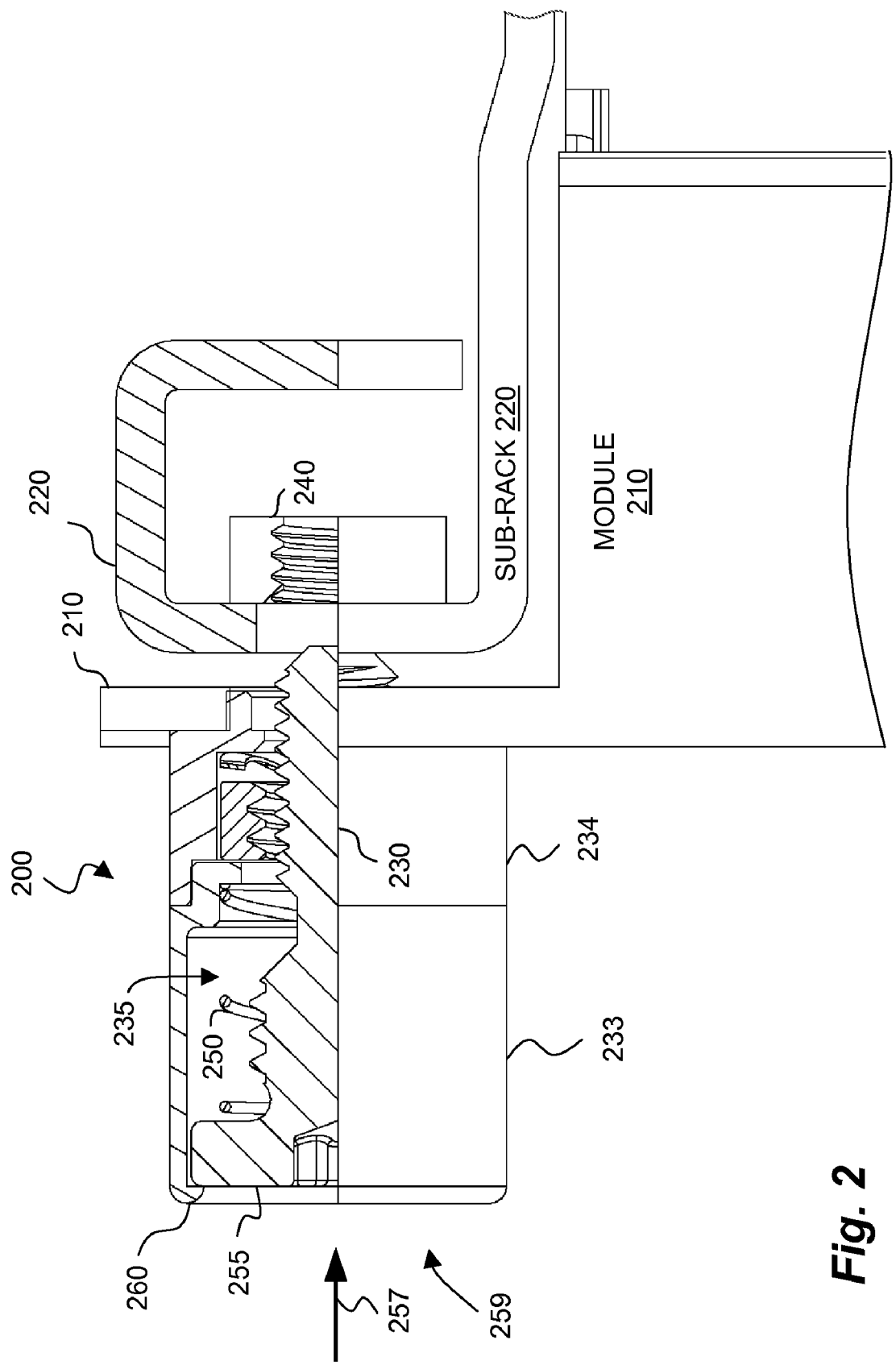
FIG. 2 shows a cross-section of a fastener disengaged from a sub-rack.

FIG. 2 shows a cross-section of a fastener 200 such as the fastener of FIG. 1 positioned to secure a module 210 in a sub-rack 220, which may be an electronics enclosure sub-rack or the like. As shown in FIG. 2, the fastener 200 has not yet engaged the sub-rack 220. A second threaded portion 230 of a screw 235 is aligned with a threaded portion 240 of the sub-rack 220 such that the respective threads can be engaged by applying an axial force to the screw head 255 in the direction of an arrow 257 and rotating the screw head 255 with a screwdriver or other tool. A lip 260 may retain the screw 235 in a top housing 233 of the fastener 200, with the screw head 255 biased toward an opening 259 in the top housing 233 by a spring 250, such as a compression spring or the like. In this manner, the screw 235 may be loosely immobilized in a suitable position so that it does not axially float within the fastener 200, while permitting the screw 235 to travel axially upon an application of force, such as due to a force applied directly along the arrow 257 or an axial force that is created as the screw 235 rotationally engages a nut within the fastener 200.

By way of example, the fastener described herein may be used with a module and enclosure conforming to the PCI Industrial Computer Manufacturers Group ("PICMG") standards for enclosures such as AdvancedTCA, AdvancedMC, MicroTCA, and the like. MicroTCA is a PICMG standard targeted at providing an off-the-shelf chassis for use with Advanced Mezzanine Cards. The MicroTCA standard defines a specific spacing between an AMC module and a sub-rack into which it is placed. Using the fastener described herein, a screw 235 may be retained within the top housing 233 and a bottom housing 234 of the fastener 200, with the second threaded portion 230 aligned with threads in the MicroTCA sub-rack, which may be the sub-rack 220 described above. As the screw 235 is tightened (as shown below in FIG. 3), the internal cinching mechanism of the fastener 200 may lock the screw 235 after a certain number of turns. At the same time that the screw 235 is cinching a nut 130 or the like internally, the second threaded portion 230 may engage threads in the sub-rack 220. Thus the module 210 may be secured at a fixed distance from the sub-rack 220 by the threads of the fastener 200, which are rotationally secured by the internal cinching mechanism. While an AMC module 210 and a MicroTCA Sub-Rack 220 are depicted in FIG. 2, it will be understood that the fastener disclosed herein may be usefully employed in any environment where a screw-type fastener is desired to secure an item a fixed distance from a threaded mount without applying force along the screw axis as a result of threading into or cinching against the threaded mount.

Figure 3:
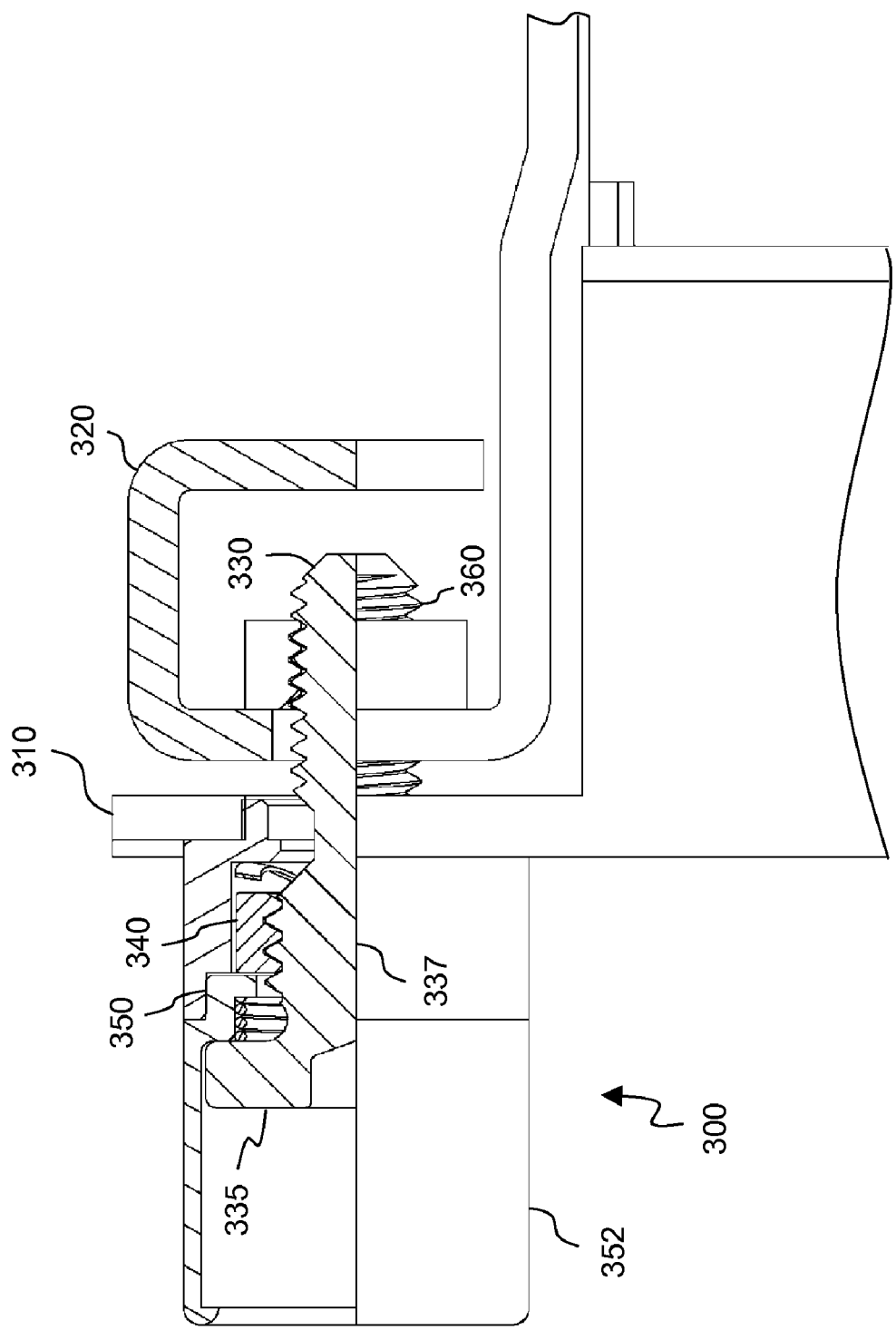
FIG. 3 shows a cross-section of a fastener engaged to a sub-rack.

FIG. 3 shows a cross-section of a fastener 300 securing a module 310 to a sub-rack 320. As shown, the screw 330 is cinched in position by a screw head 335 (after application of rotational force with a screwdriver or similar tool) against a bottom lip 350 of a top housing 352 with an opposing force applied by a nut 340, which is similarly bottomed out against a partition or translational stop formed by the bottom lip 350 between the screw head 335 and the nut 340. This translational stop may secure the nut 340 and the screw head 335 at a predetermined translational location within the fastener 300, e.g., with the nut 340 and the screw head 335 each a predetermined distance from the first opening and the second opening of the fastener 300. A second threaded portion 360 of the screw 335 may be threaded into the sub-rack 320 without applying a substantial axial force (left or right in FIG. 3) to the sub-rack 320. That is, as a first threaded portion 337 of the screw 330 engages the nut 340, the screw 330 may continue to move axially toward the sub-rack 320 so that the second threaded portion 360 can continue threading into the sub-rack 320. This may result in a no-load attachment of the module 310 to the sub-rack 320 in which the two parts are attached by a screw without imposing a substantial load on the module 310 or the sub-rack 320 in order to cinch the screw 330. This may relieve loading and/or stress under conditions where the application of a lateral force might cause warping, cracking, or other electrical or mechanical damage.

Thus as described above the screw head 335, partition (as formed, for example, by the bottom lip 350 of the top housing 352 in FIG. 3), and nut 340, and any suitable washers, springs, and other supplemental hardware may cooperate to form an internal threading mechanism that permits the second threaded portion to progressively extend out of the housing 352, such as by axial force applied to the screw head 335 or as the screw 330 engages an external screw hole, and that rotationally cinches the screw 330 after the second threaded portion 360 has extended a predetermined distance out of the housing. While embodiments are shown and described above, it will be understood that any internal threading, locking, or other mechanism may be similarly employed in a fastener without departing from the scope of this disclosure.

The fastener may be designed to meet any of a variety of functional specifications. For example, a minimum number of turns on the second threaded portion 360 may be required for the screw 330 to fully engage the sub-rack 320, and where this is a design requirement, the fastener 300 may be adapted to permit that minimum number of turns before cinching. Likewise, a maximum number of turns on the second threaded portion 360 may be desired, and the fastener 300 may be adapted to prevent more than such a maximum number of turns. The design may similarly be specified as a minimum or maximum distance that the second threaded portion 360 extends from the fastener 300.

The disclosed fastener may be useful in a variety of applications. For example, the fastener may be used to secure a chassis, shelf, or rack a fixed distance from a component with the fastener. The disclosed fastener may also be usefully employed in high vibration environments where a load between components (due to conventional threaded fasteners or other attachment means) is undesirable. The disclosed fastener may more generally be used in any application where two objects are to be held at a fixed distance or in a fixed relationship without actually being bound to one another through a load-bearing connection.

While the invention has been disclosed in connection with the preferred embodiments shown and described in detail, various modifications and improvements thereon will be readily apparent to those skilled in the art. Accordingly, the spirit and scope of the present invention is not to be limited by the foregoing examples, but is to be understood in the broadest sense allowable by law.

What is claimed is:

1. A device comprising:
a screw with a screw head, a first threaded portion, a second threaded portion, and a central axis, the first threaded portion nearer to the screw head along the central axis and having a first pitch and the second threaded portion farther from the screw head along the central axis and having a second pitch;
a nut including interior threads corresponding to the first threaded portion, the nut positioned around the central axis of the screw;
a housing having a first opening that exposes the screw head while retaining the screw head within an interior of the housing, and the housing having a second opening through which the second threaded portion can extend, the interior of the housing rotationally retaining the nut and providing a translational stop for the nut that prevents the nut from traveling closer than a predetermined distance toward the first opening when the first threaded portion engages the nut; and
a spring that biases the screw toward the first opening of the housing.

2. The device of claim 1 wherein the first pitch is different from the second pitch.

3. The device of claim 2 wherein the second pitch is finer than the first pitch.

4. The device of claim 1 wherein the nut has an interior diameter greater than an outside diameter of the second threaded portion of the screw.

5. The device of claim 1 further comprising a partition between the screw head and the nut where the nut can securely cinch the screw head by engaging the first threaded portion.

6. A device comprising:
a screw with a screw head, a first threaded portion and a second threaded portion;
a housing around the screw, the housing having an interior with a partition between a first opening in the housing that exposes the screw head and a second opening in the housing that exposes the second threaded portion, wherein the screw head is retained within the first opening by at least one of a lip and a crimp; and
a nut within the interior and adjacent to the partition, the nut capable of engaging the first threaded portion of the screw to rotationally cinch the screw to the partition with the screw in a position having the second threaded portion extending out of the interior of the housing.

7. The device of claim 6 wherein the second threaded portion has a smaller diameter than the first threaded portion.

8. The device of claim 6 wherein the first threaded portion has a different pitch than the first threaded portion.

9. The device of claim 6 further comprising a coil spring around the screw and positioned between the screw head and the partition to bias the screw head toward the first opening.

10. The device of claim 6 further comprising a washer around the screw and positioned between the nut and the partition.

11. The device of claim 6 further comprising a return spring that biases the nut toward the partition.

12. The device of claim 6 wherein the nut is keyed to an interior portion of the housing to prevent a rotation of the nut upon an application of rotational force thereto.

13. The device of claim 6 wherein the housing has an external feature keyed to an insert in a module faceplate.

14. The device of claim 6 wherein the second threaded portion has a pitch adapted to threadably engage with a threaded screw hole of an enclosure sub-rack.

15. The device of claim 14 wherein the enclosure sub-rack is a MicroTCA sub-rack.

16. The device of claim 6 wherein the screw head includes one or more of a Phillips head, a hex head, a flat head, a hexalobular head, an internal hexalobular head, and a square head.

17. The device of claim 6 wherein the screw head includes one or more of a thumb screw and a wingnut.

18. A device comprising:
a screw with a screw head, a first threaded portion, a second threaded portion, and a central axis, the first threaded portion nearer to the screw head along the central axis and having a first pitch and the second threaded portion farther from the screw head along the central axis and having a second pitch;
a nut including interior threads corresponding to the first threaded portion, the nut positioned around the central axis of the screw;
a spring that biases the nut toward the screw head; and
a housing having a first opening that exposes the screw head while retaining the screw head within an interior of the housing, and the housing having a second opening through which the second threaded portion can extend, the interior of the housing rotationally retaining the nut and providing a translational stop for the nut that prevents the nut from traveling closer than a predetermined distance toward the first opening when the first threaded portion engages the nut.

19. The device of claim 18 wherein the first pitch is different from the second pitch.

20. The device of claim 19 wherein the second pitch is finer than the first pitch.

21. The device of claim 18 wherein the nut has an interior diameter greater than an outside diameter of the second threaded portion of the screw.

22. The device of claim 18 further comprising a partition between the screw head and the nut where the nut can securely cinch the screw head by engaging the first threaded portion.

* * * * *